United States Patent
Yoshimura et al.

(10) Patent No.: US 8,232,692 B2
(45) Date of Patent: Jul. 31, 2012

(54) INDUCTION MOTOR EQUIPPED WITH HEAT DISSIPATING DISC FOR DISSIPATING ROTOR HEAT

(75) Inventors: Kazuki Yoshimura, Minamitsuru-gun (JP); Yasuyuki Nakazawa, Minamitsuru-gun (JP); Shinichi Kinoshita, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 72 days.

(21) Appl. No.: 12/878,331

(22) Filed: Sep. 9, 2010

(65) Prior Publication Data

US 2011/0109176 A1    May 12, 2011

(30) Foreign Application Priority Data

Nov. 9, 2009  (JP) .................... 2009-255984

(51) Int. Cl.
H02K 1/32 (2006.01)
(52) U.S. Cl. ................. 310/64; 310/58; 310/59
(58) Field of Classification Search .............. 310/58–59, 310/64, 52
See application file for complete search history.

(56) References Cited

U.S. PATENT DOCUMENTS

| | | | | |
|---|---|---|---|---|
| 4,144,932 A | * | 3/1979 | Voigt | ............ 165/80.3 |
| 4,465,948 A | * | 8/1984 | Oyama et al. | ............ 310/62 |
| 6,078,115 A | | 6/2000 | Uchida et al. | |

FOREIGN PATENT DOCUMENTS

| | | |
|---|---|---|
| DE | 697 35 801 T2 | 10/2010 |
| JP | 57-009240 A | 1/1982 |
| JP | 58-22859 U | 2/1983 |
| JP | 63-179764 | 11/1988 |
| JP | 2-22055 | 2/1990 |
| JP | 2000-32710 | 1/2000 |
| JP | 2004-222428 | 8/2004 |
| JP | 2007-282341 | 10/2007 |
| JP | 2007-336721 | 12/2007 |
| JP | 2007336721 A * | 12/2007 |
| JP | 2008-029150 | 2/2008 |
| JP | 2008-43149 | 2/2008 |
| JP | 2008029150 A * | 2/2008 |

OTHER PUBLICATIONS

Japanese Notice of Reasons for Refusal mailed Oct. 26, 2010 issued in Japanese Application No. 2009-255984 (including partial translation thereof).

Japanese Notification of Reasons for Refusal mailed Feb. 1, 2011 issued in Japanese Application No. 2009-255984 (including English-language translation thereof).

* cited by examiner

Primary Examiner — Quyen Leung
Assistant Examiner — Leda Pham
(74) Attorney, Agent, or Firm — Drinker Biddle & Reath LLP

(57) ABSTRACT

An induction motor has a rotation detector, a heat dissipating disc for dissipating heat generated from a rotor, and a cooling fan for forcibly cooling the heat dissipating disc with outside air. The heat dissipating disc is disposed between the rotation detector and the cooling fan.

6 Claims, 5 Drawing Sheets

INDUCTION MOTOR EQUIPPED WITH HEAT DISSIPATING DISC FOR DISSIPATING ROTOR HEAT

RELATED APPLICATION DATA

This application claims priority under 35 U.S.C. §119 and/or §365 to Japanese Application No. 2009-255984 filed Nov. 9, 2009, the entire contents of which are incorporated herein by reference.

BACKGROUND OF THE INVENTION

1. Field of the Invention

The present invention relates to an induction motor and, more particularly, to an induction motor equipped with a heat dissipating disc that dissipates heat generated from the rotor.

2. Description of the Related Art

Induction motors have a simple structure and thereby can be easily serviced, so they are most widely used in the industry. The induction motor has independent windings in its stator and rotor; it is operated by electromagnetic induction caused from one winding to the other winding.

FIG. 6 is a perspective view showing an example of a conventional induction motor 100. FIG. 7 is a cross sectional view of the conventional induction motor shown in FIG. 6. The induction motor 100 has a stator 1 and a rotor 2; end brackets 31, 32 are attached at both ends of the stator 1, and the rotor 2, which is cylindrical, is fixed to a first shaft 3 rotating about a rotation center axis 22 of the induction motor, the rotor 2 being inserted inside the inner circumference of the stator 1.

The first shaft 3, to which the rotor 2 is fixed, is rotatably supported by a bearing 23 attached to the end bracket 31 and by a bearing 25 attached to the end bracket 32. A code plate, which is part of a rotation detector 4, is fixed to the first shaft 3 at the end of the unloaded side, concentrically with the rotation center axis 22.

A plurality of slots is formed in the inner wall of the stator 1, along a direction parallel to the rotation center axis 22, a stator winding being placed in these slots. Part of the stator winding extends beyond both ends of the stator 1 as coil ends 24 and 26.

Due to the principle of operation of the induction motor 100, the rotor 2 generates heat in proportion to generated torque. That is, the surfaces of the rotor 2 become hot due to a loss caused by a polarity change. When the rotation detector 4 is attached to the induction motor 100, the heat generated from the rotor 2 may cause adverse effects such as damage to the rotation detector 4 and a reduction in detection precision.

As shown in FIG. 7, a cooling fan 6 is provided in a first fan housing 5 so that it faces the end bracket 32 in which the rotation detector 4 is disposed. The cooling fan 6 sucks outside air from cooling air inlets 27 through vents 7 formed in the end brackets 31, 32 and the stator 1 and exhausts the sucked air through cooling air outlets 28, so the cooling fan 6 indirectly cools through a lid 30 the first shaft 3 to which the rotation detector 4 is attached. Accordingly, a cooling air flow 8 does not strike the rotor 2 or first shaft 3 and thus the rotor 2 becomes hot, so the rotation detector 4 attached to the shaft is thermally damaged and detection precision drops.

There is a known technology by which the heat generated from the rotor 2 is dissipated by a heat dissipating in attached to the rotor 2.

Japanese Patent Application Laid-Open No. 2008-43149 discloses a technology in which a dissipating fin is attached to a rotor. With this technology, outside air is taken into the interior of a motor, so the bearings and windings of the motor are highly likely to be damaged in an environment filled with dust or an atomized liquid.

Japanese Patent Application Laid-Open No. 2000-32710 discloses another technology in which a relay axis is attached to a rotor so as to extend toward an unloaded side, and a heat dissipating fin is attached between a rotation detector and the rotor. Since, in this technology, the rotation detector is disposed at a location distant from a bearing, the natural frequency of the relay axis is reduced and thereby the rotational speed is limited and detection precision drops.

The technologies disclosed in the above two patent documents have a common problem in that, although the cooling power needs to be maximized while the motor is operating with large torque at low speed, the cooling power cannot be fully used.

SUMMARY OF THE INVENTION

The present invention addresses the above problem with the object of providing an induction motor equipped with a heat dissipating disc that dissipates heat generated from the rotor.

The induction motor according to the present invention includes: a stator having ventilation through-holes at several locations along an outer circumference, the ventilation through-holes extending along a central axial direction; a rotor inserted inside an inner circumference of the stator; a rotation detector for detecting rotation of the induction motor, the rotation detector being attached to an unloaded side of a shaft to which the rotor is fixed; a heat dissipating disc for dissipating heat generated from the rotor, the heat dissipating disc being attached to an end of the unloaded side of the shaft; and a cooling fan for forcibly cooling the heat dissipating disc with outside air. The heat dissipating disc is disposed between the rotation detector and the cooling fan.

The heat dissipating disc can have a labyrinth structure so that the interior of the induction motor and outside air passages communicate with each other.

A hollow spacer may be provided between the stator and the cooling fan to define a space in which the heat dissipating disc is disposed.

A surface of the heat dissipating disc can be uneven to expand its heat dissipating area.

The heat dissipating disc can have a balance correcting means for correcting the balance of the rotor.

By achieving the structure described above, the present invention can provide an induction motor equipped with a heat dissipating disc for dissipating heat generated from the rotor.

DETAILED DESCRIPTION OF THE PREFERRED EMBODIMENTS

Figure 1:
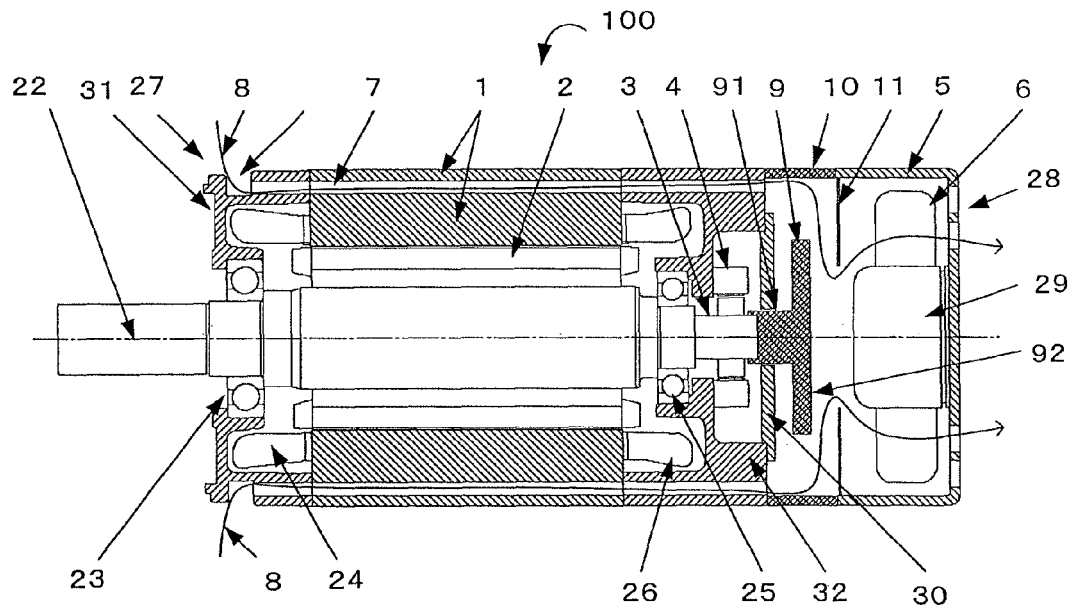
FIG. 1 illustrates an induction motor according to a first embodiment of the preset invention.

Embodiments of the present invention will be described with reference to the drawings. Components identical or similar to components in a conventional induction motor are indicated by identical reference numerals.

First, an induction motor in a first embodiment of the present invention will be described with reference to FIG. 1. In the structure in this embodiment, a first heat dissipating disc 9 is used to dissipate heat generated from a rotor 2.

The induction motor 100 has a stator 1 and the rotor 2; end brackets 31, 32 are attached at both ends of the stator 1, and the rotor 2, which is cylindrical, is fixed to a first shaft 3, the rotor 2 being inserted inside the inner circumference of the stator 1.

The first shaft 3, to which the rotor 2 is fixed, is rotatably supported by a bearing 23 attached to the end bracket 31 and by a bearing 25 attached to the end bracket 32. A heat dissipating disc 9 is fixed at the end of the unloaded side of the first shaft 3. A code plate, which is part of a rotation detector 4, is fixed to the first shaft 3 on the unloaded side, concentrically with a rotation center axis 22.

A plurality of slots is formed in the inner wall of the stator 1, along a direction parallel to the rotation center axis 22 of the induction motor, a stator winding being placed in these slots. Part of the stator winding extends beyond both ends of the stator 1 as coil ends 24 and 26.

Figure 6:
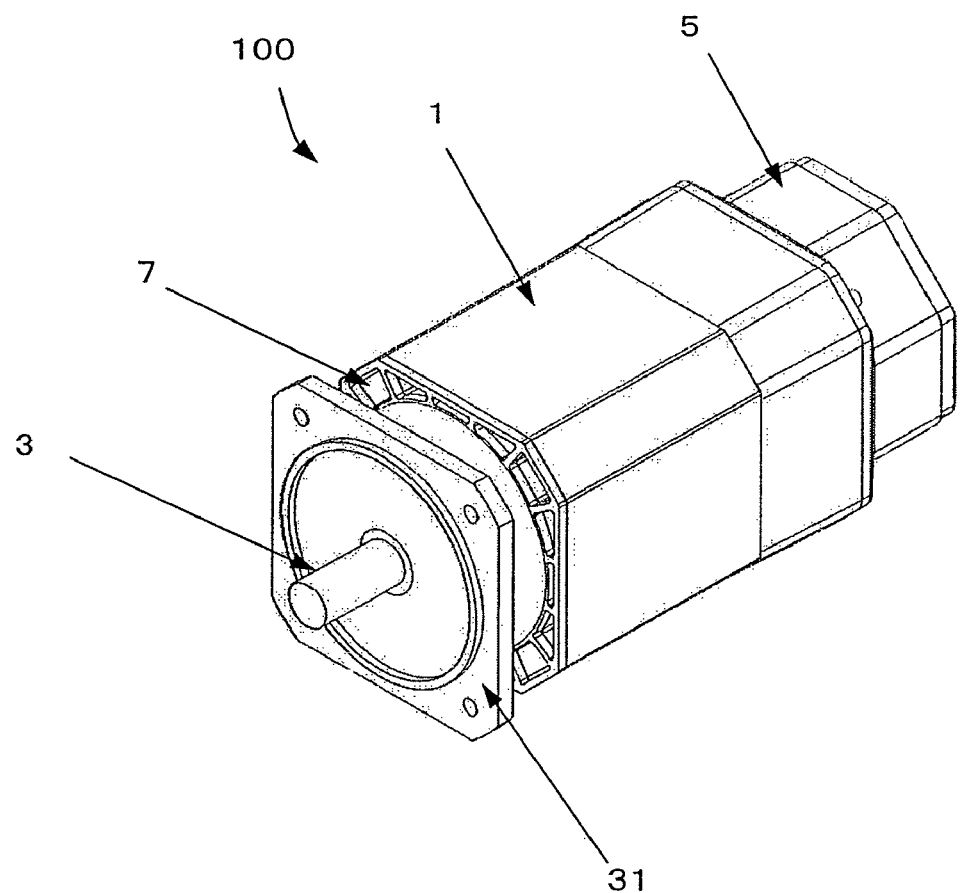
FIG. 6 is a perspective view showing an example of a conventional induction motor.
Figure 7:
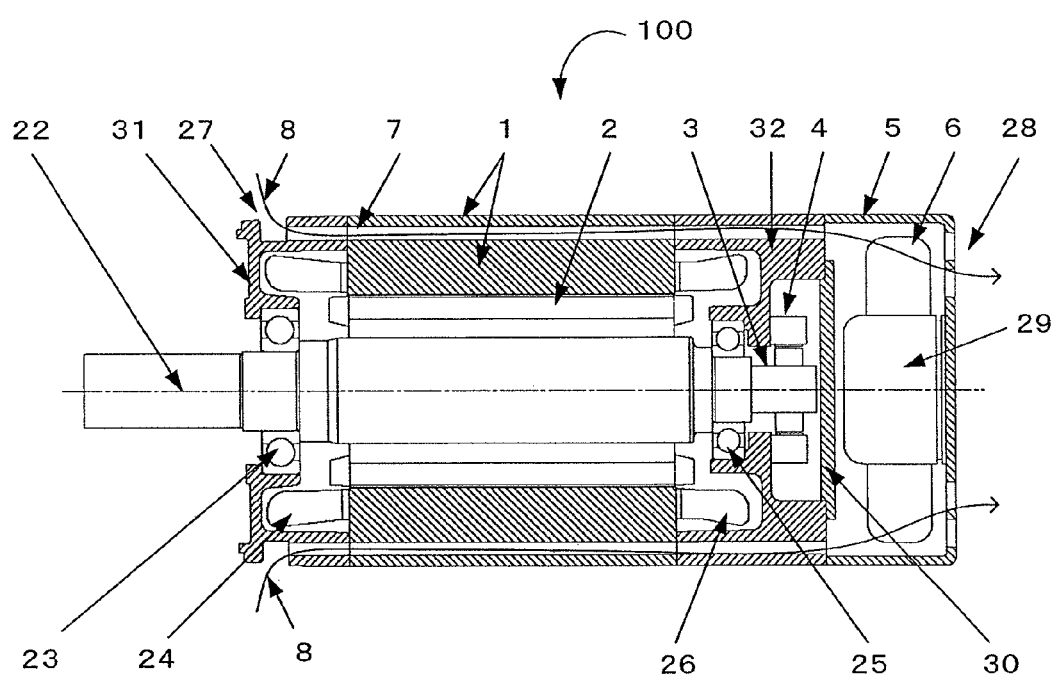
FIG. 7 is a cross sectional view of the induction motor shown in FIG. 6.

As described above with reference to FIGS. 6 and 7, due to the principle of operation of the induction motor 100, the rotor 2 generates heat in proportion to generated torque. That is, the surfaces of the rotor 2 become hot due to a loss caused by a polarity change.

Therefore, the induction motor according to the first embodiment of the present invention uses the first heat dissipating disc 9. The first heat dissipating disc 9, which is made of an aluminum material or another material having superior heat transfer characteristic, has a fixing part 91 fixed to the first shaft 3 at its end, concentrically with the rotation center axis 22, and a disc surface 92 for dissipating heat.

The rotation detector 4 is disposed inside the end bracket 32 and covered with a lid 30. The lid 30 has a hole through which the fixing part 91 of the first heat dissipating disc 9 passes. The fixing part 91 is firmly fixed to the first shaft 3 at its end by welding, caulking, or another method.

One end of a cylindrical spacer 10 having openings at its both ends is fixed or removably attached to the end bracket 32 in which the rotation detector 4 is disposed. A first fan housing 5 is fixed or removably attached to the other end of the spacer 10. A cooling fan motor 29 having a cooling fan 6 is disposed in the first fan housing 5. The cylindrical spacer 10 defines a space in which the first heat dissipating disc 9 is placed. The cooling fan 6 is attached to the end bracket 32 through the cylindrical spacer 10.

In a case as well in which the cylindrical spacer 10 is disposed between the end bracket 32, and the cooling fan 6 (which is disposed in the first fan housing 5) to attach the first heat dissipating disc 9 to the first shaft 3 according to the first embodiment of the present invention, the first fan housing 5, which has been conventionally used to accommodate the cooling fan 6, can be used without alteration.

A partitioning plate 11 is provided in the first fan housing 5, as shown in FIG. 1. The partitioning plate 11 is an annular member having a through-hole at its center so that outside air used for cooling purposes flows toward the disc surface 92 of the first heat dissipating disc 9. The outer circumference of the partitioning plate 11 is fixed to the first fan housing 5.

The rotation of the cooling fan 6 disposed in the first fan housing 5 is driven by the cooling fan motor 29 so that outside air is sucked from cooling air inlets 27. The outside air is exhausted from cooling air outlets 28 through vents 7 formed in the end brackets 31, 32 and the stator 1. The cooling air inlets 27 are formed between the stator 1 and the end bracket 31 (opposite to the end bracket 32 to which the rotation detector 4 is attached). The cooling air outlets 28 are formed at the bottom of the first fan housing 5.

As shown in FIG. 1, the cooling air flows from the loaded side of the induction motor 100 toward the unloaded side, as indicted by reference numeral 8. However, the flow of the outside air may be reversed by reversing the rotational direction of the cooling fan motor 29, as compared to the flow direction shown in FIG. 1 (that is, the outside air may be sucked from the cooling air outlets 28 and exhausted from the cooling air inlets 27; in other words, the outside air may flow from the unloaded side of the induction motor 100 toward the loaded side). The direction of the cooling air flow can be appropriately selected according to the environment in which the induction motor 100 is installed.

Heat generated from the rotor 2 and transferred through the first shaft 3 is dissipated by the first heat dissipating disc 9. Accordingly, it is possible to prevent a reduction in detection precision of the rotation detector 4 and damage to the rotation detector 4, which would be otherwise caused by the heat generated from the rotor 2. The stator 1 and the end brackets 31, 32 are cooled by the cooling air flow 8 as before.

Figure 2:
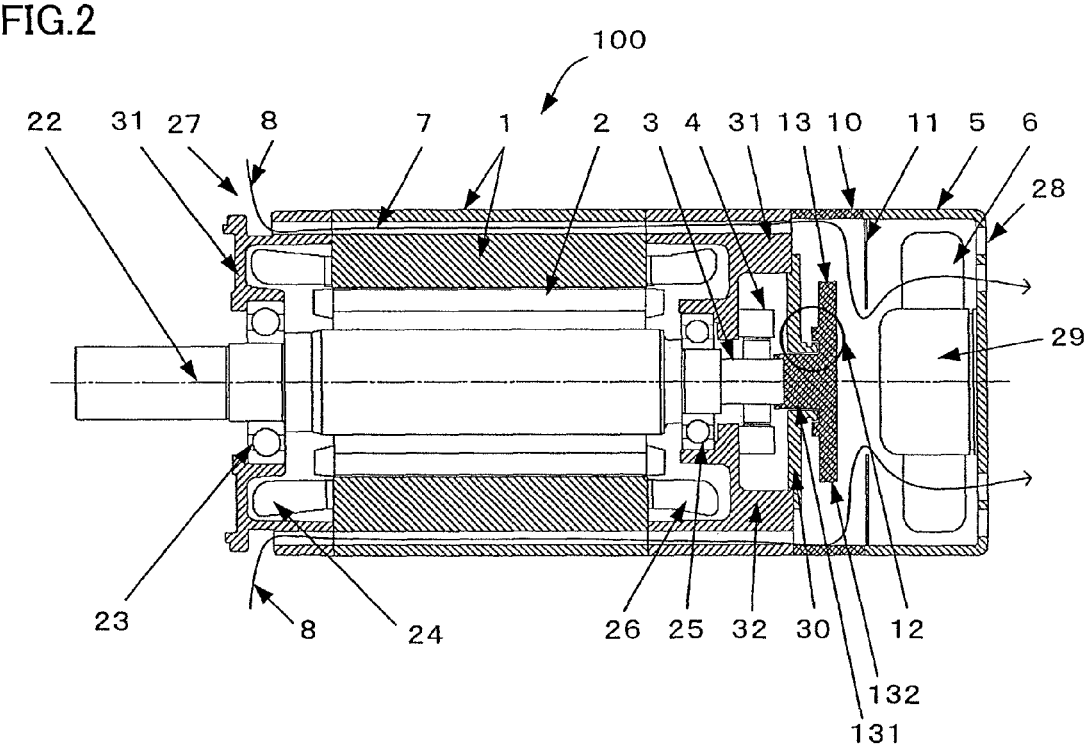
FIG. 2 illustrates an induction motor according to a second embodiment of the present invention.

Next, an induction motor in a second embodiment of the present invention will be described with reference to FIGS. 2 and 3. In the structure in this embodiment, a second heat dissipating disc 13, which dissipates the heat generated from the rotor 2, has a labyrinth function.

As with the first heat dissipating disc 9 shown in FIG. 1, the second heat dissipating disc 13, which is made of an aluminum material or another material having superior heat transfer characteristic, has a fixing part 131 fixed to the first shaft 3 at its end, concentrically with the rotation center axis 22, and a disc surface 132 for dissipating heat. The second heat dissipating disc 13 further has a labyrinth structure 12.

In the first embodiment shown in FIG. 1, there is a space between the first heat dissipating disc 9 and the lid 30 attached to the end bracket 32 in which the rotation detector 4 is placed, so dust and other foreign substances externally enter the induction motor 100.

To prevent foreign substances from entering the induction motor 100, in the second embodiment, the second heat dissipating disc 13 has the labyrinth structure 12. FIG. 3 is a magnified view illustrating the labyrinth structure in FIG. 2.

Figure 3:
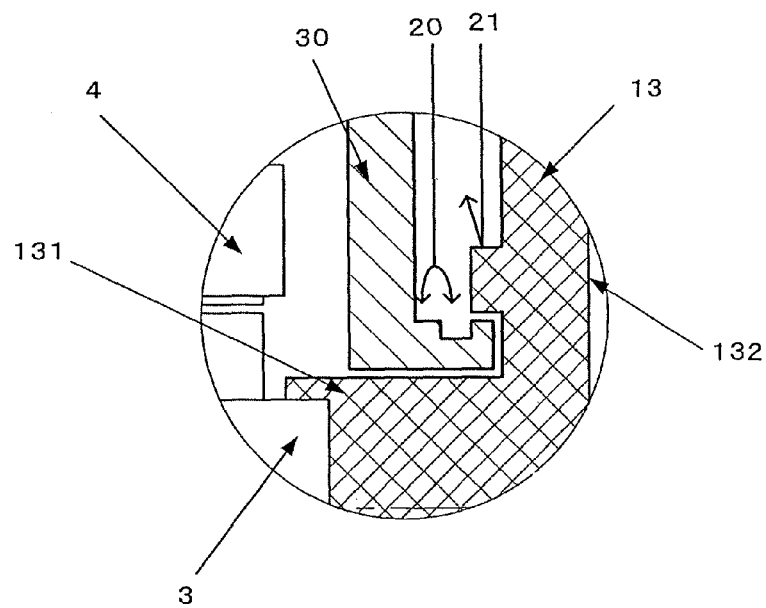
FIG. 3 is a magnified view illustrating the labyrinth structure in FIG. 2.

As shown in FIG. 3, a foreign substance 20 strikes a projection, which is part of the labyrinth structure 12 formed for the lid 30, slides down along the projection, and stays at the bottom of the cylindrical spacer 10 or is exhausted to the outside by the cooling fan 6 together with the cooling air flow 8. Another foreign substance 21 strikes a projection, which is part of the labyrinth structure 12 of the second heat dissipating disc 13. Since the second heat dissipating disc 13 is fixed to the first shaft 3 and thereby rotates together with the first shaft 3, the foreign substance 21 is radially impelled to by centrifugal force, preventing the foreign substance 21 from entering the induction motor 100.

Next, an induction motor in a third embodiment of the present invention will be described with reference to FIG. 4.

In the structure in this embodiment, a shaft extends backward without a spacer being used and a surface of the heat dissipating disc is uneven.

Figure 4:
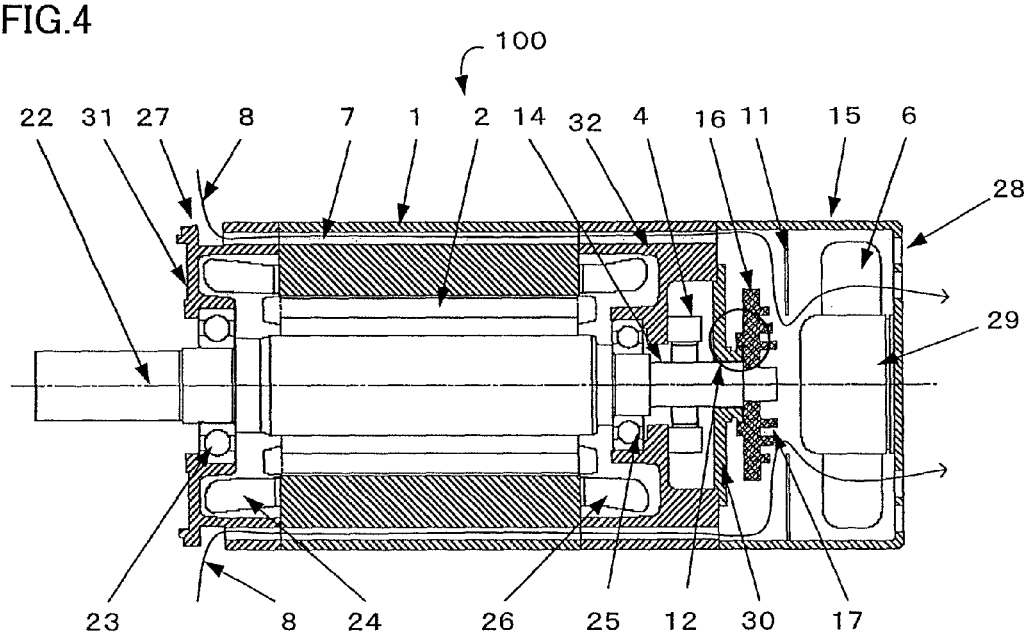
FIG. 4 illustrates an induction motor according to a third embodiment of the present invention.

A second shaft 14, to which the rotor 2 is fixed, extends backward as shown in FIG. 4 (that is, toward the unloaded side), and a third heat dissipating disc 16 is fitted and fixed to the extended end. The third heat dissipating disc 16 has the labyrinth structure 12 and also has an uneven shape 17 on its surface. The uneven shape 17 expands the surface area of the third heat dissipating disc 16 so that more heat is dissipated. The uneven shape 17 may be formed by, for example, a plurality of independent columns. The uneven shape 17 can also be applied to the first and second embodiments shown in FIGS. 1 and 2 to expand the heat dissipating area.

In this embodiment, the cooling fan motor 29 having the cooling fan 6 is disposed in a second fan housing 15. The second fan housing 15, attached to the end bracket 32, is an equivalent obtained by forward extending an end of the first fan housing 5 shown in FIGS. 1 and 2, as shown in FIG. 4. Since the end of the second fan housing 15 is expanded forward in this way, a space in which to place the third heat dissipating disc 16 is obtained.

In this embodiment, the second shaft 14 passes through the rotation detector 4 and further extends up to the outside of the lid 30. The third heat dissipating disc 16 fits into the externally extending part of the second shaft 14.

Figure 5:
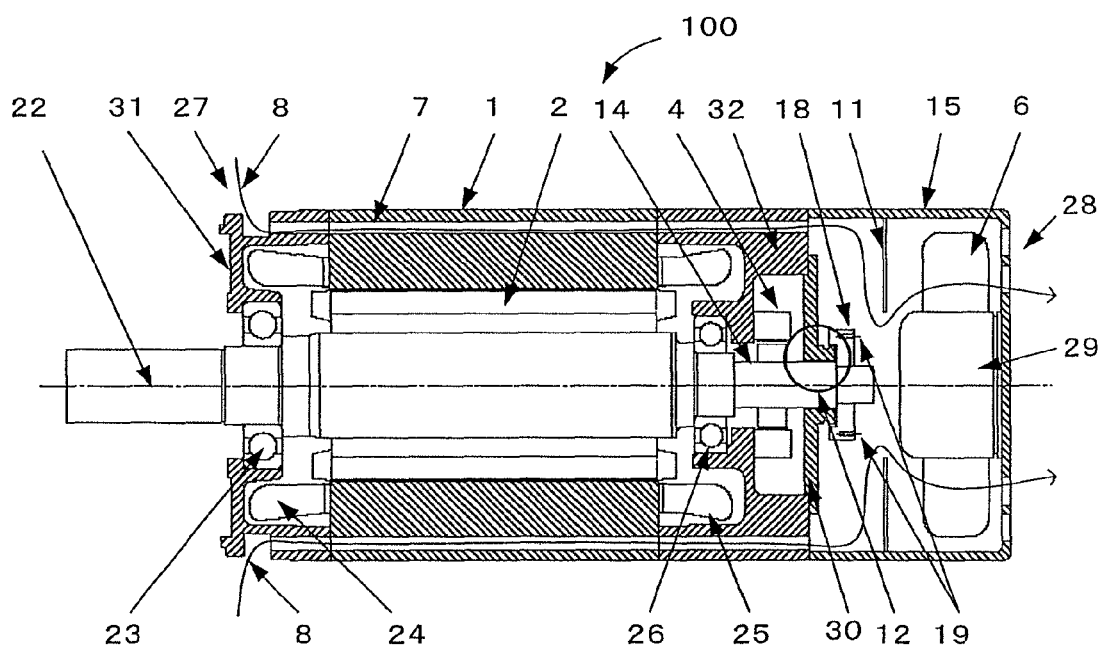
FIG. 5 illustrates an induction motor according to a fourth embodiment of the present invention.

Next, an induction motor in a fourth embodiment of the present invention will be described with reference to FIG. 5. A fourth heat dissipating disc 18 used in this embodiment has a balance correcting tap 19 by which the balance of the rotor 2 can be corrected.

The present invention can dissipate heat generated from a rotor without having to flow outside air into an induction motor. The rotor can be cooled independently of the rotational speed of the induction motor.

The present invention can prevent foreign substances from entering the motor by using a labyrinth structure.

The present invention enables a heat dissipating disc to be placed without largely modifying a conventional motor.

The present invention can correct the balance of the rotor by using the heat dissipating disc.

The invention claimed is:

1. An induction motor that includes a stator having ventilation through-holes for allowing the passage of cooling air at several locations along an outer circumference, the ventilation through-holes extending along a central axial direction, and a rotor inserted inside an inner circumference of the stator, the induction motor comprising:
   a rotation detector for detecting rotation of the induction motor, the rotation detector being attached to an unloaded side of a shaft to which the rotor is fixed;
   a heat dissipating disc for dissipating heat generated from the rotor, the heat dissipating disc being attached to an end of the unloaded side of the shaft;
   a cooling fan for forcibly cooling the heat dissipating disc with outside air; and
   a partitioning plate which has a through-hole at its center so that the cooling air flows toward the disc surface of the heat dissipating disc;
   wherein the heat dissipating disc is disposed between the rotation detector and the cooling fan.

2. The induction motor according to claim 1, wherein the heat dissipating disc has a labyrinth structure so that an interior of the induction motor and outside air passages communicate with each other.

3. The induction motor according to claim 1, wherein a hollow spacer is provided between the stator and the cooling fan to define a space in which the heat dissipating disc is disposed.

4. The induction motor according to claim 1, wherein a surface of the heat dissipating disc is uneven to expand a heat dissipating area thereof.

5. The induction motor according to claim 2, wherein a surface of the heat dissipating disc is uneven to expand a heat dissipating area thereof.

6. The induction motor according to claim 1, wherein the heat dissipating disc has a balance correcting means for correcting balance of the rotor.

* * * * *